United States Patent [19]
Karales

[11] Patent Number: 6,040,013
[45] Date of Patent: *Mar. 21, 2000

[54] VACUUM TUMBLING OF MEATS AND OTHER FOODS

[75] Inventor: Stephen P. Karales, 2011 Riverside Dr., Suite 300, Columbus, Ohio 43221

[73] Assignee: Stephen P. Karales, Parma Heights, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/975,566

[22] Filed: Nov. 21, 1997

Related U.S. Application Data

[63] Continuation of application No. 08/759,836, Dec. 2, 1996, abandoned, which is a continuation of application No. 08/605,683, Feb. 22, 1996, abandoned, which is a continuation of application No. 08/328,484, Oct. 25, 1994, abandoned.

[51] Int. Cl.[7] .................................................... A23L 1/31
[52] U.S. Cl. .................... 427/281; 426/652; 426/519; 99/472; 366/54; 366/139; 366/220
[58] Field of Search .................................... 426/281, 442, 426/519, 652; 99/472, 535; 366/54, 139, 217, 220, 225–227, 233, 236, 231

[56] References Cited

U.S. PATENT DOCUMENTS

| | | | |
|---|---|---|---|
| 7,766 | 11/1850 | Starkweather | 426/281 |
| 96,978 | 1/1869 | Sherwood, Jr. | 99/535 |
| 3,928,634 | 12/1975 | Gasbarro | 426/281 |
| 4,214,518 | 7/1980 | Petsche | 99/535 |
| 4,229,458 | 10/1980 | Dreano et al. | 426/281 X |
| 4,446,779 | 5/1984 | Hubbard et al. | 99/472 |
| 4,520,718 | 6/1985 | Prosenbaüer | 99/535 |
| 4,836,099 | 6/1989 | Thirode | 99/472 |
| 5,323,694 | 6/1994 | Higashimoto | 366/139 X |

OTHER PUBLICATIONS

Humyiker, O.F., "Working the Butter", The butter Industry, third edition, 1940.

"Vacuum Massaging: A Basic Aproach", Meat Processing, Feb. 1982, pp. 42–45 & 48.

*Primary Examiner*—Milton Cano
*Attorney, Agent, or Firm*—Frank H. Foster; Kremblas, Foster, Millard & Pollick

[57] ABSTRACT

Pieces of meat are tumbled with a marinade in a tumbler that has a smoothly continuous surrounding side wall with no protrusions or baffles or other protrusions contacting the pieces of meat. The tumbler is rotated about the axis of the side wall and gas is pumped from the tumbler during the tumbling to maintain a reduced pressure. The gas may be pumped to maintain a lower reduced pressure for a first time interval and to permit a higher pressure, still below atmospheric pressure, for a second period of time during a rest period. These two pressure levels are alternated during the alternate tumbling and rest periods.

9 Claims, 5 Drawing Sheets

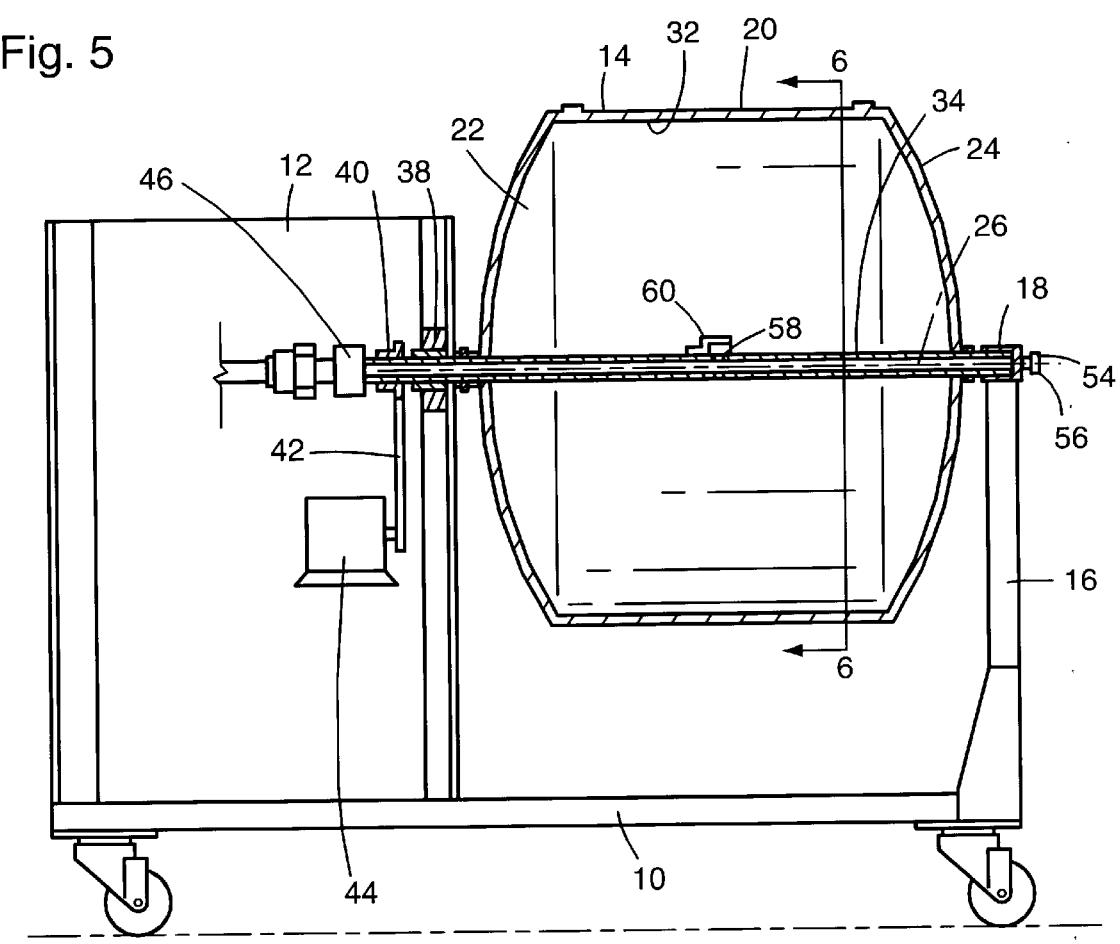

VACUUM TUMBLING OF MEATS AND OTHER FOODS

This is a continuation of Ser. No. 08/759,836, filed Dec. 2, 1996, now abandoned, which is a continuation of Ser. No. 08/605,683, filed Feb. 22, 1996, now abandoned, which is a continuation of Ser. No. 08/328,484, filed Oct. 25, 1994, now abandoned.

TECHNICAL FIELD

This invention relates generally to food processing methods and apparatus, and more particularly is directed to a method and an apparatus for tumbling meat or other food pieces in the presence of a marinade in an enclosed, sealed drum under a vacuum.

BACKGROUND ART

Consumers have long preferred meats and other foods which are moist, flavorful, and tender. The meat processing industry has recognized that these characteristics may be improved by tumbling pieces of meat in a rotating tumbler in the presence of a marinade and under reduced pressure.

The application of a vacuum expands and removes the gases located in the interstitial spaces within the meat and assists in effecting the absorption of the marinade into the meat. The application of a vacuum also helps mechanically distort the meat by expanding it, which assists in the breakdown of the meat fibers to enhance tenderization. The marinade typically contains tenderizing agents, flavoring agents as well as moisture, and thus the absorption of the marinade into the meat further enhances the moisture content, the tenderization, and the flavoring of the meat. The increased moisture results in a moister cooked meat product. The principal purpose of physically tumbling the meat pieces is to cause the marinade to penetrate throughout the entire piece of meat as a result of the repeated compression of the meat resulting from impact with other meat pieces and the tumbler. Additionally, the mechanical action of tumbling further mechanically works the meat product to enhance tenderization.

In conventional vacuum tumbling, the interior walls of the tumbler are provided with a plurality of baffles which enhance the stirring action and lift the meat pieces above the axis of drum rotation so that they can fall down into the marinade and upon other meat pieces in order to enhance stirring and the physical beating of the meat. Typically, the meat is placed in such a rotatable drum with the marinade and a closure is sealed. A vacuum is then drawn, the vacuum pump is disconnected from communication with the drum, and the tumbling action is begun by driving the drum in rotation. As the drum contents are tumbled, the pressure slowly increases in the interior of the drum as a result of the escape of gases from the meat pieces and the vaporization of liquid contents within the drum. One common practice is to use industrial size tumblers which may hold on the order of 8,000 pounds of meat. Rotation is continued for a half hour time interval, followed by a time interval, such as a half hour, of no tumbling, which is termed the "rest period". Conventionally, the tumbling period and rest period are alternated typically for an eight hour period. By the time the tumbling is complete, the interior pressure has risen substantially over the eight hour period. The meat products are then removed and packaged or processed further.

The prior art technology has some disadvantageous characteristics which the present invention seeks to improve.

First, it is desirable that the pieces of meat, following treatment in the tumbler, exhibit an appearance and other physical characteristics which are as close as possible to those of the fresh meat product which were placed into the tumbler. Conventional tumbling processes often cause physical damage to meat products, cutting the meat of some products or placing cuts on the skin, sometimes causing the bones of bone-in meat product to be broken or torn away from the meat. It is theorized that this results from the fact that prior art tumblers are provided with baffles which lift the meat products above the axis of rotation so that they fall further down with a greater striking force, often repeatedly falling upon the relatively sharp edge of a baffle moving along the bottom of the rotating drum. The physical damage to the meat products is sometimes so extensive that processors must place the meat product in a former and apply pressure in an attempt to return it to the shape of the original piece. Sometimes, because of the likelihood of such physical destruction, moisture and marinade is instead added to a bone-in product by means of hypodermic injection instead of by tumbling.

It is therefore an object and feature of the present invention to improve the appearance and presentation of the meat pieces treated in a tumbler by reducing or eliminating the physical damage or alteration to the pieces of meat and to other less durable foods such as vegetables.

One purpose of tumbling is the uniform penetration of the entire piece of meat with a substantial quantity of marinade. A purpose and feature of the present invention is to substantially reduce the time which is required to accomplish at least the same amount of marinade pick-up and penetration as is accomplished in the prior art, but to do so in a substantially reduced time. For example, tests have shown that, using the present invention, as much or more pick-up and penetration can be accomplished with the present invention in a time period of four hours as conventional technology can accomplish in eight hours. One advantage of this is that the meat product is tumbled for a shorter period of time and thus is held at a higher temperature for a shorter period of time. This permits less time for bacterial action, thus reducing bacteria levels in the tumbled product, which in turn increases shelf life. Another advantage of the reduced time is that production throughput and efficiency are increased, consequently lowering the cost of processing.

A typical meat treating tumbling apparatus and method for use on a smaller scale is illustrated in U.S. Pat. No. 3,928,634.

BRIEF DISCLOSURE OF INVENTION

In the method for treating pieces of food by tumbling in a marinade, the pieces are tumbled in a tumbler which has a smoothly continuous surrounding interior side wall having no protrusions contacting the pieces of meat, with the tumbler being rotated about the axis of the surrounding side wall. Gas is pumped from the tumbler even during the tumbling in order to maintain a reduced pressure. The combination of the gentle, stirring-like tumbler action in the absence of baffles combined with the maintenance of the vacuum by continuing pumping during tumbling, together decrease the required processing time and eliminate the physical deterioration or destruction of the pieces of meat. The process is further improved, especially for larger meat pieces, by alternating the interior pressure under vacuum between two different vacuum pressure levels, both of which are below atmospheric pressure.

BRIEF DESCRIPTION OF DRAWINGS

FIG. 5 is a front view partially in section taken substantially along the line 5—5 of FIG. 1 to illustrate the interior of the drum and its associated apparatus of the embodiment of FIG. 1. This is a quarter section through an axial center line which is the axis of rotation.

Figure 1:
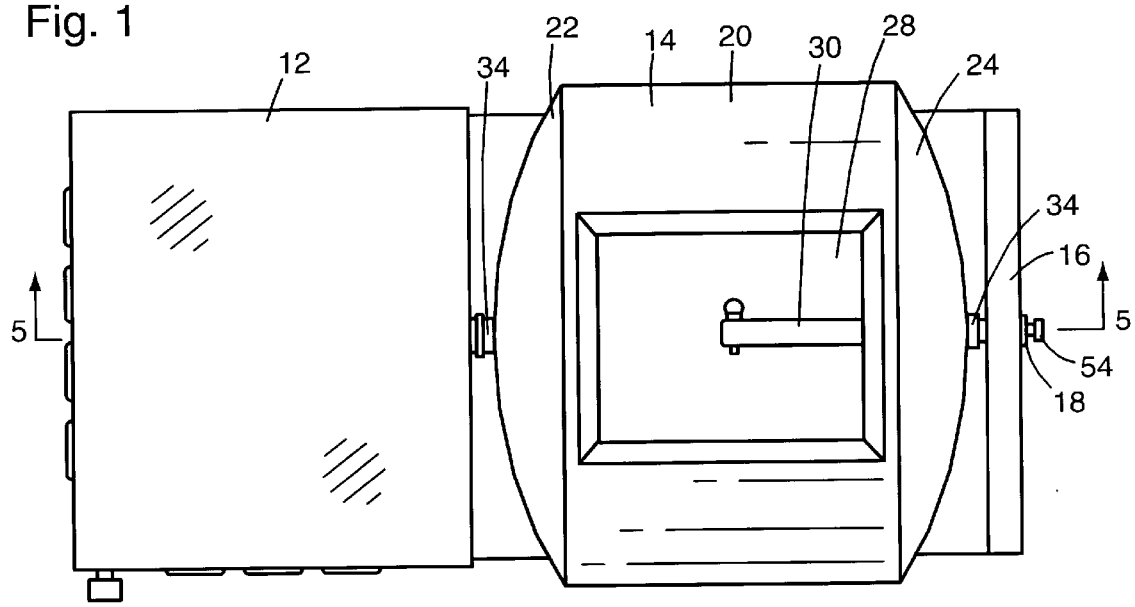
FIG. 1 is a top plan view of an apparatus embodying the present invention and utilizing parts in the method of the present invention.
Figure 2:
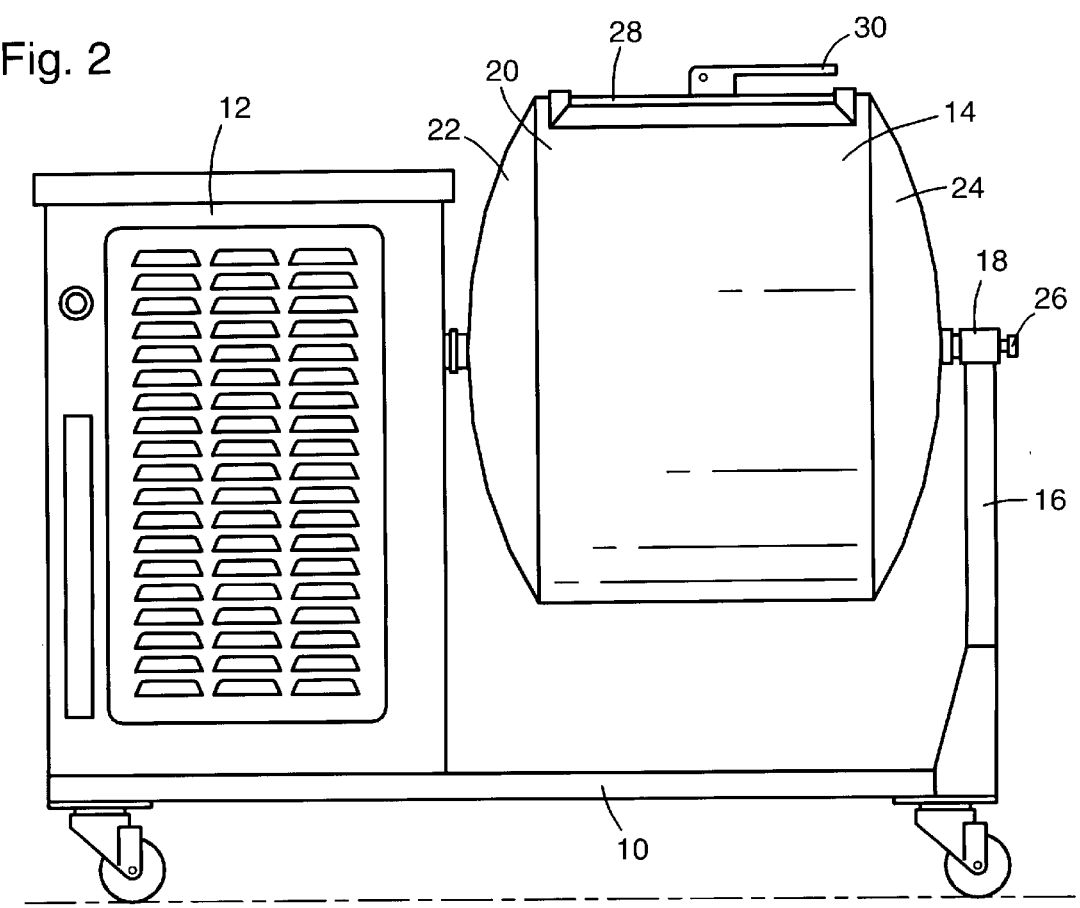
FIG. 2 is a front view of the embodiment of FIG. 1.
Figure 4:
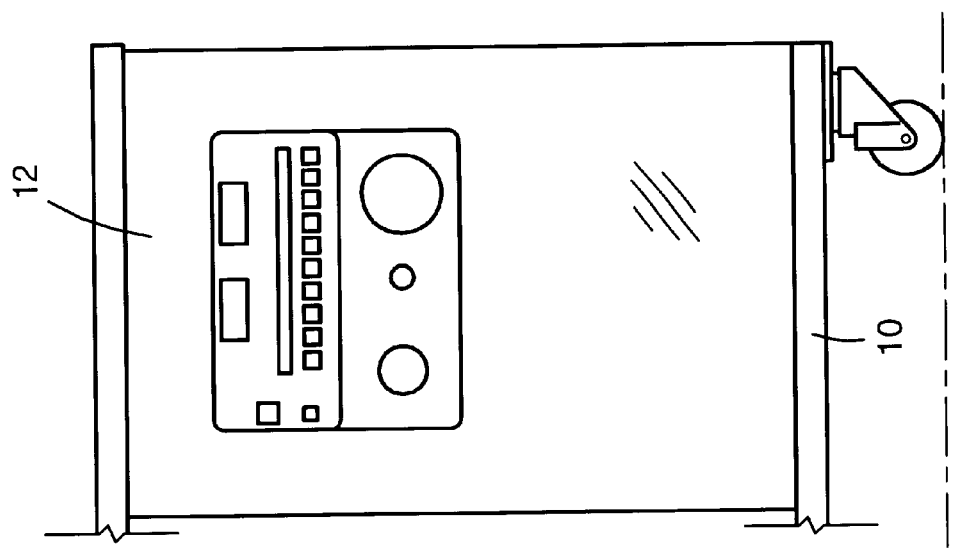
FIG. 4 is a rear view of the control cabinet and drive portion of the embodiment of FIG. 1.
Figure 3:
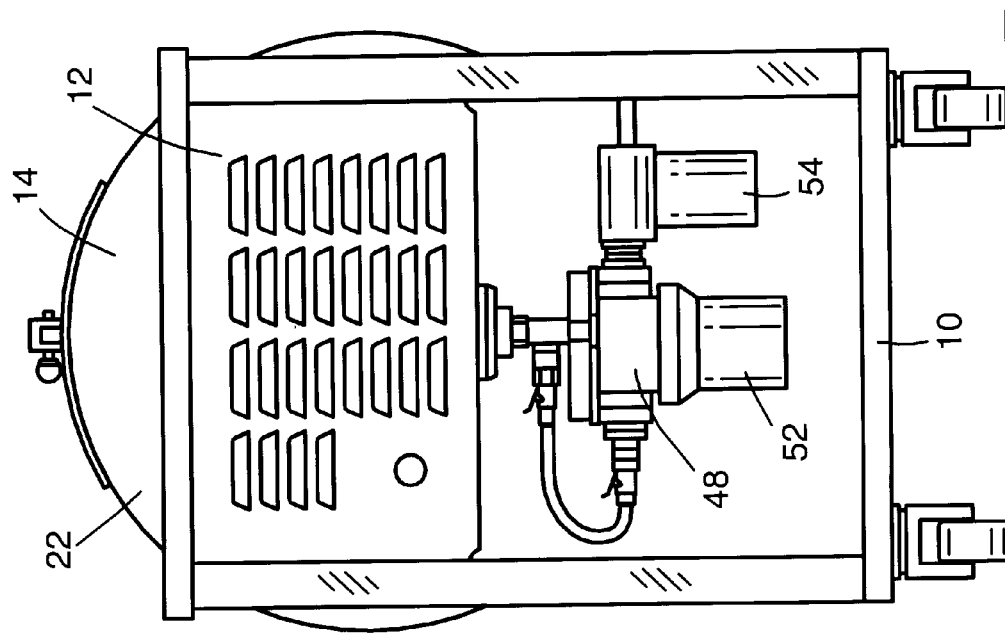
FIG. 3 is a view of the right end of the embodiment illustrated in FIG. 1.
Figure 6:
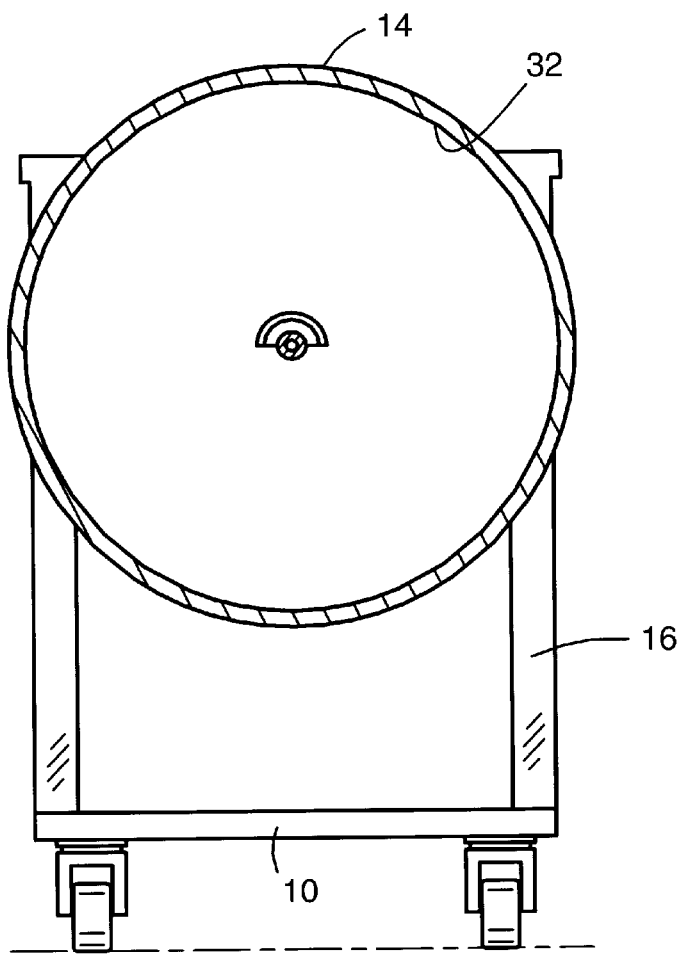
FIG. 6 is an end view partially in section taken substantially along the line 6—6 of FIG. 5.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish similar purpose.

DETAILED DESCRIPTION

FIGS. 1–6 illustrate the apparatus embodying the invention and utilized for performing the methods of the present invention. The apparatus has a support frame 10 upon which are mounted a cabinet 12 and a rotatable drum 14. The cabinet 12 contains controls, a drive motor and drive linkage and a vacuum pump and other plumbing for drawing a vacuum and illustrated in FIG. 8. At the right end of the support frame 10 is an upstanding, rectangular bearing support 16 to which is fixed a bearing 18.

The drum 14 has a cylindrical surrounding side wall 20 fixed to opposite end walls 22 and 24. The drum 14 is rotatably mounted for rotation about the axis 26 of the cylindrical side wall 20. An opening is formed in the conventional manner in the side wall 20 around which the closure 28 seals in the conventional manner to provide an air tight seal when a vacuum is drawn in the interior of the drum 14. A handle 30 is provided to latch or release the closure 28 in a conventional manner. The interior surface of the side wall 20 is essentially baffleless. It is essentially smoothly continuous along its entire meat and marinade contacting, interior surface 32.

A central tubular axle 34 is sealed and welded to the end walls 22 and 24 and extends axially through the drum 14, extending out of the drum into the bearing 18 at the right end of the drum 14 and extending out of the left end of the drum 14 into a similar bearing 38 (FIG. 5). As seen in FIG. 5, the tubular axle 34 is journalled for rotation in the bearings 18 and 38 and is fixed to a sprocket 40 which is drivingly connected by a drive chain 42 to a drive motor 44. The drive motor and its drive linkage to the drum preferably rotate the drum at a rate of approximately 7–12 revolutions per minute. The hollow interior of the tubular axle 34 is connected through a rotating coupling 46, to the plumbing components illustrated in FIG. 8 (and subsequently briefly described) and ultimately to a vacuum pump. The end of the tubular axle 34 at the bearing 18 is also provided with a tube plug 54 to prevent ambient air from being drawn into the interior of the tubular axle 34 during operation, but allowing the plug 54 to be removed for cleaning.

Figure 8:
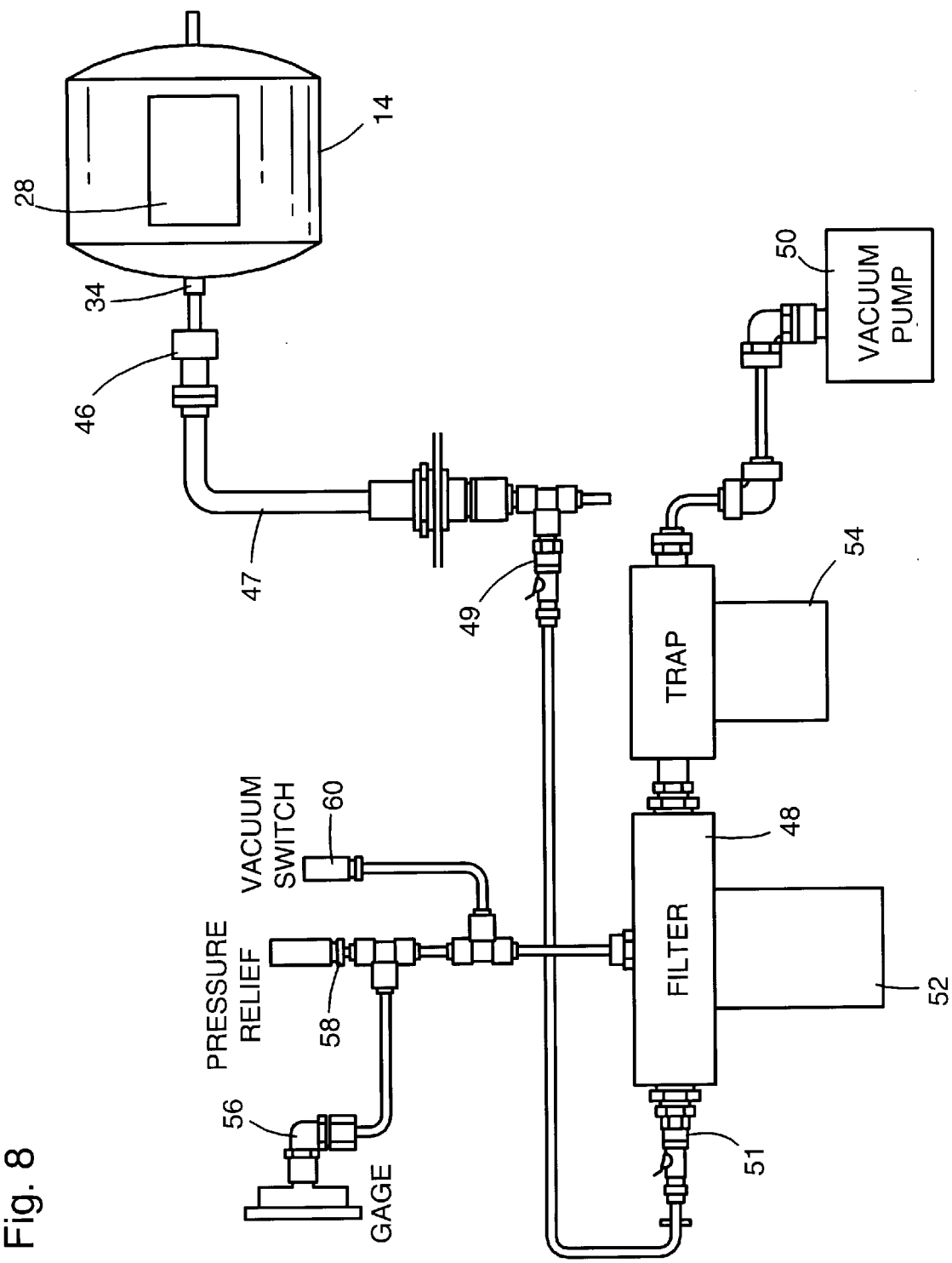
FIG. 8 is a diagram illustrating the plumbing connections used in the preferred mode of constructing the present invention.

Radial bores 58 are formed through the central portion of the tubular axle 34. The radial bores 58 are shielded from contact with the contents of the drum by a cover 60. In this manner, a sealed passageway extends from the interior of the drum 14, through the radial bores 58, into the central passageway of the tubular axle 34, and thus out the end of the tube through the rotating coupling 46, through various other plumbing components and into a vacuum pump 50 (FIG. 8). Thus, the vacuum pump 50 may be actuated at any time during the rotation of the drum 14 or during the rest period for drawing vapors and gases from the interior of the drum.

The combination of maintaining a reduced pressure by means of the vacuum pump 50 drawing gases during the tumbling operation, combined with the absence of baffles on the smooth interior walls of the drum 14 provides improved marinade pick-up in less time, while simultaneously eliminating mechanical damage to the meat or other food pieces. Pieces of meat, instead of being lifted and dropped by baffles onto other pieces of meat or the sharp edges of other baffles, simply roll over each other in a gentle kneading action. The pieces follow a somewhat elliptical path as they are raised along the interior side wall of the drum 14 from the bottom of the pile, until they roll inwardly of the drum, down over the top of the pile of other pieces. Other pieces then roll upon them and the elliptical path is repeated, somewhat in the manner of the motion of water in a lake as a result of wave action.

The pressure value or values at which the interior of the drum is maintained during treatment of the meat pieces and the time interval length and timing sequence are all capable of a wide variety of choices suitable for various types of food products. Generally, however, there are two types of processing which are preferable. For smaller meat pieces of a few pounds or less, a single batch process is preferred. For larger pieces of five pounds or more, dual pressure, repetitive cycling or pulsing is utilized.

For example, for the smaller pieces in which the single batch processing technique is used, the vacuum pump is operated to first obtain and to then maintain a vacuum of, for example, twenty-four millimeters of mercury for a treatment time period. Typical treatment time periods include approximately ten minutes for seafood, fifteen minutes for boneless poultry, twenty-five minutes for bone-in poultry, twenty-five minutes for thick steaks, roasts, and pork, and thirty-five minutes for bone-in red meats and pork. After this first period of treatment time is completed, a rest period may be utilized if desired.

Figure 7:
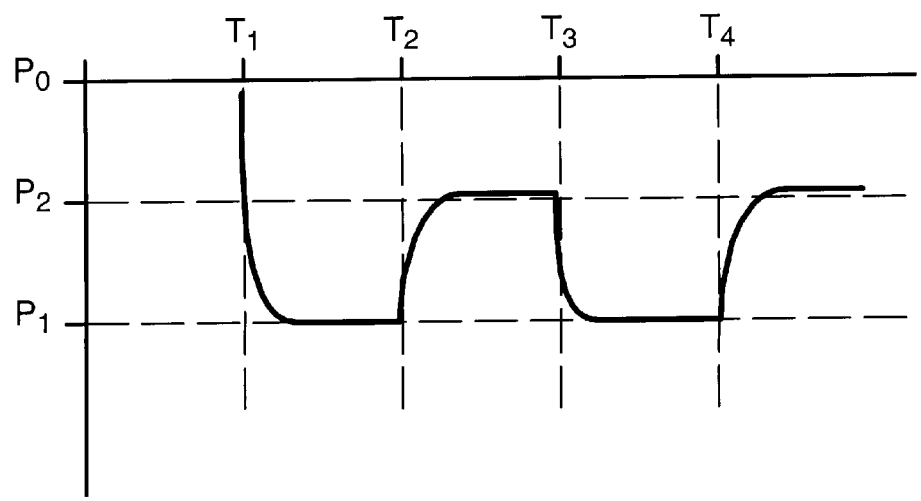
FIG. 7 is a graphical diagram illustrating the two vacuum pressure level time sequencing of the vacuum in accordance with the method of the present invention.

For treating large pieces, such as ham, large pieces of pork or large bone-in turkey or rump roast, eye-of-round tenderloin, and the like, the pulsing process is preferred. The pulsing process is illustrated in FIG. 7. In the pulse processing technique, the food products and marinade are loaded into the drum and the door is sealed. At time $T_1$, rotation has begun and the vacuum pump 50 begins drawing gas from the interior of the drum 14 to lower the pressure to a first, lower pressure value $P_1$. $P_1$ may, for example, be a pressure of 24 millimeters of mercury. Of course, evacuation can begin before rotation begins.

After pressure $P_1$ is reached, a conventional pressure switch, which is a part of the conventional vacuum pump 50, is then used with a conventional, prior art control circuit to maintain the internal pressure at pressure $P_1$. At the end of the first time interval extending from time $T_1$ to time $T_2$, the vacuum pump 50 is then turned off, either manually or by an automatic control circuit, to permit the pressure to rise to a second pressure value $P_2$. $P_2$ may, for example, be a pressure of twelve millimeters of mercury. The vacuum pump then manually, or preferably by an automatic control system provided with the commercially available vacuum pump, maintains the pressure in the interior of the drum 14 at the pressure value $P_2$. Preferably, during this second time interval, rotation of the drum is halted and a rest period is permitted. Then, at the end of the second time interval at time $T_3$, the vacuum pump 50 is actuated to again reduce the pressure to $P_1$ and the cyclical operation of the first and second time intervals is repeated as desired.

The preferred length of these time intervals, that is the time from $T_1$ to time $T_2$, and similarly the time from $T_2$ to $T_3$ is twenty minutes. This alternate cycling between the lower pressure $P_1$ during a time interval while tumbling the meat pieces and a higher pressure $P_2$ while resting, is then repeated for the desired length of time, such as preferably four hours.

The above method of processing the food pieces increases the rate at which the marinade infiltrates the it food product, and yet does so very gently. The process is so gentle that vegetables, such as potatoes, carrots or turnips may be tumbled in the marinade. Similarly, even ground food products like sausage and hamburger can be tumbled, flavored and enhanced in moisture in accordance with the method of the present invention.

In an additional alternative method of processing, the vacuum may be maintained at the lower pressure for an entire first interval of, for example, twenty minutes and then a rest period during which rotation ceases may be initiated without intentionally raising the pressure, but instead permitting it to rise slowly and naturally as gases within the food products equalize in pressure to the pressure of the interior of the drum during a rest period. This can be followed by reinitiating the vacuum pump to again return the pressure down to its lower value. By controllably varying the internal pressure of the vacuum which is drawn, the food pieces are gently and alternately expanded and contracted in a massaging action which causes the marinade to migrate to the interior of the food piece, somewhat in the manner of alternately squeezing and relaxing a sponge. Each expansion of the food product during the alternate pressure cycling is slightly greater than the previous one because of the continued breakdown of the muscle fiber bonds as the gentle, mechanical working of the food product, combined with the chemical activity of the marinade enzymes tenderize the meat product.

In the food processing industry, the amount of moisture added to the food product is known as its pick-up. Pick-up is the weight increase of the product, divided by the weight of the product before treatment, defined in percentage. The method and apparatus of the present invention provide a greater pick-up than conventional processing in a treatment time of approximately half the treatment time required for conventional processing.

The process is so gentle that boneless, skinless chicken breast may be processed in accordance with the present invention and comes out looking as fresh as it did as when it went into the drum 14.

FIG. 8 illustrates the plumbing connections utilized with the preferred embodiment of the invention. The particular plumbing configuration and combination of components does not form a part of the present invention. The plumbing components are conventional, commercially available components. The rotatable coupling 46 is connected through a tube 47 and quick-disconnect connectors 49 and 51 to a filter 48, which includes a filter cup 52 housing the changeable filter. The filter is in turn connected to a liquid trap 54, which includes a removable receptacle and the trap 54 is in turn connected to the vacuum pump 50. The trap includes a ball float extending into the removable cup of the trap, which is connected to a microswitch, which in turn is connected to the electrical control circuit to shut down the operation of the system if the removable receptacle of the trap fills with liquid. The vacuum pump 50 includes a conventional pressure sensor and control circuit which are a part of the commercially available pump for maintaining a vacuum selected by an operator. Also connected to the filter and in communication with the vacuum pumping lines are a pressure gauge 56 for displaying the interior pressure of the system and a pressure relief valve 58 for venting the system in the event that the vacuum is excessive, that is the pressure becomes too low. Additionally, a vacuum switch 60 is connected in communication with the vacuum plumbing circuit. Manual actuation of the vacuum switch 60 vents the vacuum system to permit the vacuum system, including the interior of the drum 14, to equalize in pressure with the atmospheric pressure so that the closure 28 may be easily opened at the completion of processing.

The electrical control circuitry of the present invention forms no part of the invention and may be constructed in any of a large number of alternatives, which will be apparent to those of ordinary skill in the control circuitry art. It is preferred that the control system utilize a microprocessor so that the control is accomplished by software control. However, the system may also be manually operated in the manner described above by means of appropriate, conventional, manually controlled plumbing components.

While certain preferred embodiments of the present invention have been disclosed in detail, it is to be understood that various modifications may be adopted without departing from the spirit of the invention or scope of the following claims.

I claim:

1. A method for treating pieces of food by tumbling in a marinade, the method comprising:
   (a) tumbling the pieces of food with a marinade in a gentle kneading action so the pieces simply roll over each other, said pieces being tumbled in a sealed tumbler having a smoothly continuous, surrounding interior longitudinal side wall having a central axis parallel to the longitudinal sidewall and having no protrusions contacting the pieces of food to avoid impacting the food against a solid surface, the tumbler being rotated about the axis of the side wall; and
   (b) pumping gas from the tumbler to attain a reduced pressure at a first pressure value and then subsequently pumping gas from the tumbler during the tumbling to maintain a reduced, subatmospheric pressure during rotation until the pressure is returned to atmospheric pressure for removing the pieces of food from the tumbler;
wherein rotation is such as to avoid lifting the product higher than the axis of rotation and dropping the product while being rotated.

2. A method in accordance with claim 1 wherein the pumping is halted for a time interval to permit the internal pressure to increase during the time interval to a higher subatmospheric pressure.

3. A method in accordance with claim 2 wherein, following the time interval, the pumping is resumed to reduce and maintain the internal pressure at a reduced pressure value.

4. A method in accordance with claim 3 wherein the pumping is alternately continued and halted to alternately raise and lower the internal pressure between two subatmospheric pressures.

5. A method in accordance with claim 2 wherein, after the internal pressure increases to a selected subatmospheric second pressure value, the pumping is at times continued to maintain the pressure at the subatmospheric second pressure value which is greater than the first pressure value.

6. A method in accordance with claim 5 wherein the pressure is alternately maintained at two selected values during a plurality of sequential time intervals.

7. A method in accordance with claim 6 wherein the tumbling is halted during the intervals of higher pressure and is continued during the intervals of lower pressure.

8. A method in accordance with claim 7 wherein each of said time intervals are approximately 20 minutes.

9. A method in accordance with claim 8 wherein the pressure is maintained alternately at values of approximately 24 mm of Hg and 12 mm of Hg.

* * * * *